(12) United States Patent
Dick

(10) Patent No.: US 7,583,725 B1
(45) Date of Patent: Sep. 1, 2009

(54) DYNAMICALLY RECONFIGURABLE ADAPTIVE COMMUNICATION DEVICE AND SYSTEM

(75) Inventor: Christopher H. Dick, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 596 days.

(21) Appl. No.: 11/158,526

(22) Filed: Jun. 22, 2005

(51) Int. Cl.
*H04B 1/38* (2006.01)
*H04L 5/16* (2006.01)

(52) U.S. Cl. .................. 375/219; 375/259; 375/296; 375/224

(58) Field of Classification Search .......... 375/219, 375/224, 227, 259–260, 285, 295–296
See application file for complete search history.

(56) References Cited

U.S. PATENT DOCUMENTS

| | | | | |
|---|---|---|---|---|
| 4,701,936 A * | 10/1987 | Clark et al. | .................. | 375/232 |
| 5,282,222 A * | 1/1994 | Fattouche et al. | ........... | 375/260 |
| 5,444,696 A * | 8/1995 | Petranovich | ................ | 370/337 |
| 6,031,860 A * | 2/2000 | Nitta et al. | ............... | 372/50.11 |
| 6,324,220 B1 * | 11/2001 | Sellars | ........................ | 375/296 |
| 6,336,041 B1 * | 1/2002 | Vatalaro et al. | ............. | 455/561 |
| 6,516,025 B1 * | 2/2003 | Warke et al. | ................ | 375/222 |
| 6,714,587 B1 * | 3/2004 | Van Houtum et al. | ....... | 375/220 |
| 7,177,369 B2 * | 2/2007 | Crilly, Jr. | .................... | 375/296 |
| 7,259,587 B1 * | 8/2007 | Schmit et al. | .................. | 326/41 |
| 2002/0160731 A1 * | 10/2002 | Hashimoto et al. | .......... | 455/127 |
| 2003/0053571 A1 * | 3/2003 | Belotserkovsky et al. | ... | 375/350 |
| 2005/0008157 A1 * | 1/2005 | Hjelm | ........................ | 380/252 |
| 2005/0013352 A1 * | 1/2005 | Hottinen | ..................... | 375/219 |
| 2005/0105589 A1 * | 5/2005 | Sung et al. | .................. | 375/130 |
| 2005/0135497 A1 * | 6/2005 | Kim et al. | .................... | 375/267 |
| 2005/0141626 A1 * | 6/2005 | Lee et al. | ..................... | 375/260 |
| 2006/0039317 A1 * | 2/2006 | Subramanian et al. | ...... | 370/328 |
| 2006/0072682 A1 * | 4/2006 | Kent et al. | ................... | 375/267 |

OTHER PUBLICATIONS

U.S. Appl. No. 10/683,944, filed Oct. 10, 2003, Young.

* cited by examiner

*Primary Examiner*—Jean B Corrielus
(74) *Attorney, Agent, or Firm*—W. Eric Webostad

(57) ABSTRACT

Method and apparatus for transmission of information is described. A first transceiver has transmitter reconfigurable logic and a second transceiver has receiver reconfigurable logic. The first transceiver communicates with the second transceiver via a communication channel. The transmitter reconfigurable logic is configured to transmit preamble information and to receive a measurement of the preamble information. The receiver reconfigurable logic is configured to measure the preamble information and to transmit the preamble information measured. The preamble information is communicated via the first transceiver to the second transceiver via the communication channel. The receiver reconfigurable logic of the second transceiver measures the preamble information communicated. The measurement of the preamble information is sent via the receiver reconfigurable logic of the second transceiver to the first transceiver via the communication channel.

19 Claims, 8 Drawing Sheets

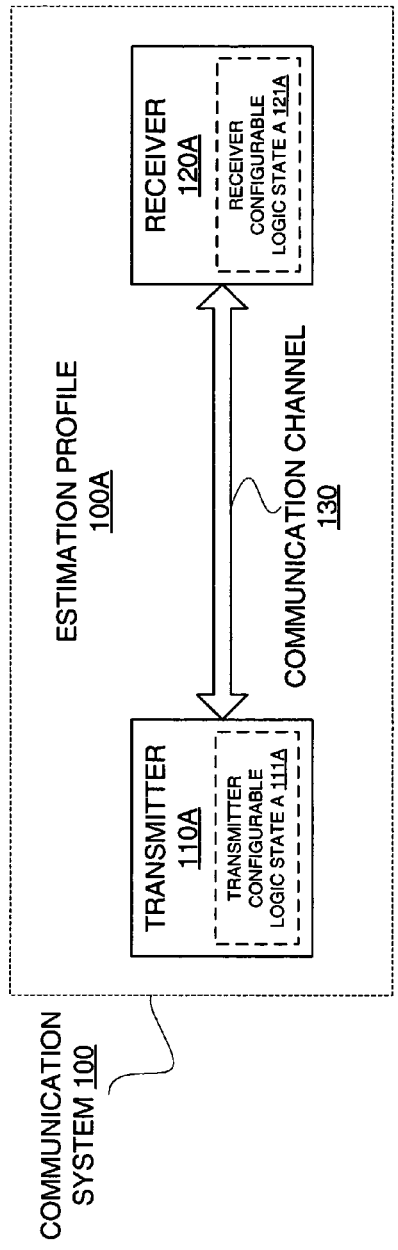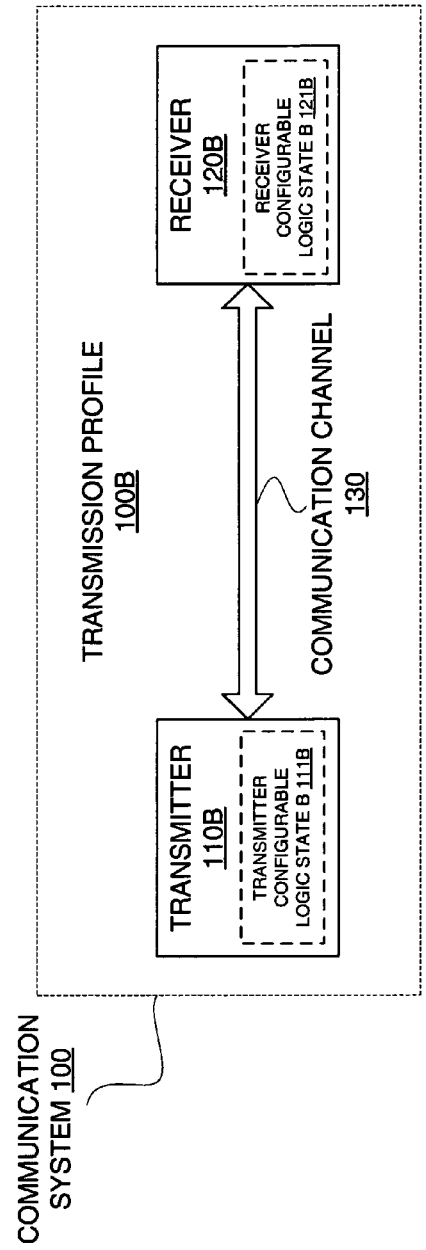

DYNAMICALLY RECONFIGURABLE ADAPTIVE COMMUNICATION DEVICE AND SYSTEM

FIELD OF THE INVENTION

One or more aspects of the invention relate generally to communication systems, and more particularly to channel adaptive communication systems.

BACKGROUND OF THE INVENTION

Various wired and wireless communication systems deploy transceivers which may use any spectrally efficient modulation scheme, such as Quadrature Amplitude Modulation ("QAM"). A channel adaptive communication system, including a transceiver, conventionally has a transmitter at one end and a receiver at another end, which communicate with each other via a communication channel. Notably, as used herein "include" and "including" mean "including without limitation. The transmitter modulates information onto a carrier signal. The modulated signal propagates to the receiver via the communication channel. The communication channel may be free space, such as a wireless channel, or confined, such as a wired channel. The receiver demodulates the information transmitted via the channel. However, multiple reflections in the communication channel may distort the transmission path in the channel and deform the signal due to an inter-symbol interference ("ISI"). The distortion caused by ISI is conventionally removed before the signal is demodulated by the receiver.

Conventionally, a pre-equalizer is used to adjust the transmitter to channel distortion to remove ISI. A transmitter may transmit a preamble set of information via a communication channel before transmitting the actually data payload. A receiver may use a channel estimator to evaluate a frequency response of the communication channel via the preamble set of information received. The estimator provides the inverse communication channel frequency response which is sent from the receiver to the pre-equalizer of the transmitter. The pre-equalizer applies the inverse channel frequency response to subsequently transmitted signals, which eliminates ISI distortion introduced by the communication channel.

Conventionally, both a transmitter and a receiver are included in a single transceiver integrated circuit, and thus dedicated transceiver circuitry is used for removal of ISI. Dedicated equalizer hardware learns the channel frequency response and evolves a set of correction coefficients which are inversely applied to a signal to correct ISI distortion. Dedicated circuitry ("hardware") responsible for adaptively equalizing ISI distortion conventionally resides in the receiver. This dedicated adaptive equalization circuitry remains in the hardware, even if the communication channel is stabilized over time, such as in cable television systems. The ever present adaptive equalization circuitry consumes power and adds cost.

Accordingly, it would be both desirable and useful to provide an adaptive communication system without one or more of the above-mentioned limitations.

SUMMARY OF THE INVENTION

An aspect of the invention is a method for communication of information. A first transceiver has transmitter reconfigurable logic and a second transceiver has receiver reconfigurable logic. The first transceiver communicates with the second transceiver via a communication channel. The transmitter reconfigurable logic is configured to transmit preamble information and to receive a measurement of the preamble information. The receiver reconfigurable logic is configured to measure the preamble information and to deliver back to the transmitter over the channel (using a robust reverse channel) the channel frequency response. This can be viewed as a channel "sounding" procedure. The preamble information is communicated via the first transceiver to the second transceiver via the communication channel. The receiver reconfigurable logic of the second transceiver measures the preamble information communicated. The measurement of the preamble information is sent via the receiver reconfigurable logic of the second transceiver to the first transceiver via the communication channel.

Another aspect of the invention is a dynamically reconfigurable channel adaptive communication system. A transmitter has reconfigurable logic configured to transmit a modulated information signal. A receiver has reconfigurable logic, the receiver coupled to the transmitter to receive the modulated information signal. The transmitter and the receiver are coupled via a communication channel. A channel estimator is instantiated in the reconfigurable logic of one of the transmitter and the receiver to measure the modulated information signal and to determine an inverse frequency response of the communication channel responsive to the modulated information signal measured. A pre-equalizer is instantiated in the reconfigurable logic of one of the transmitter and the receiver to apply the inverse frequency response of the communication channel to the modulated information signal. A respective controller is instantiated in each of the transmitter and the receiver to dynamically control reconfiguration of the reconfigurable logic of each of the transmitter and the receiver.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

FIGS. 1A and 1B are block diagrams depicting respective exemplary embodiments of an estimation profile and a transmission profile of a dynamically reconfigurable channel adaptive communication system.

To facilitate understanding, identical reference numerals have been used, where possible, to designate identical elements that are common to the figures.

DETAILED DESCRIPTION OF THE DRAWINGS

Figure 2A:
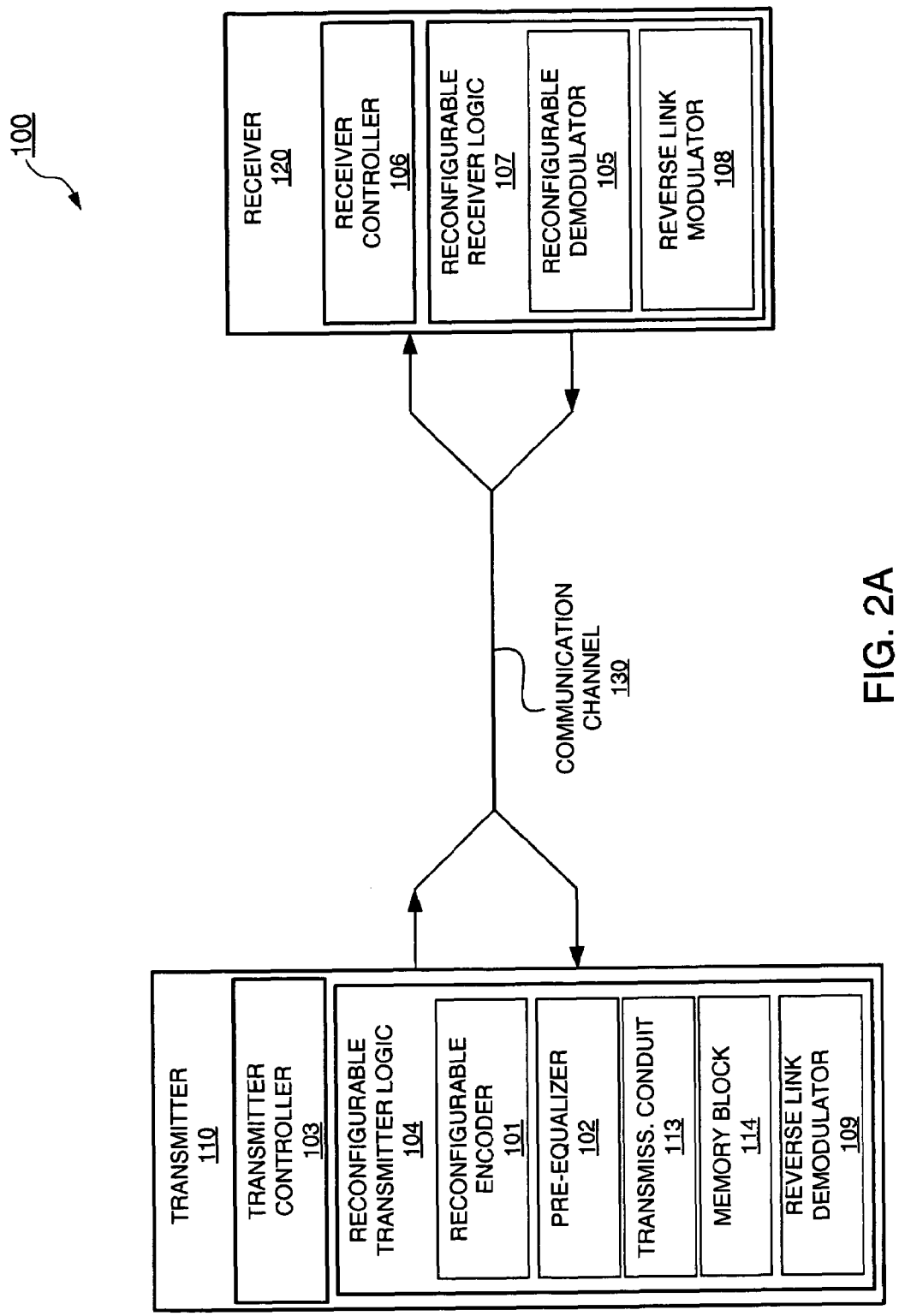
FIG. 2A is a block/schematic diagram depicting an exemplary embodiment of a dynamically reconfigurable channel adaptive communication system.

FIGS. 1A and 1B are block diagrams depicting respective exemplary embodiments of an estimation profile 100A and a transmission profile 100B of a dynamically reconfigurable channel adaptive communication system 100 ("communication system 100"). Communication system 100 includes a transmitter 110 and a receiver 120, which may be put in communication with one another via a communication channel 130. Communication channel 130 may include but is specifically not limited to coaxial cable as employed in distribution of cable television signal. Notably, though the terms "transmitter" and "receiver" are used for purposes of clearly distinguishing relative principal functional relationship between the two devices, such terms more accurately may be replaced with the term "transceiver" as it will become apparent that both the "transmitter" and "receiver" transmit and receive information.

In an estimation profile 100A, transmitter 110 includes transmitter configurable logic in logic state A 111A ("transmitter 110A") and receiver 120 includes receiver configurable logic in logic state A 121A ("receiver 120A"). Transmitter 110A and receiver 120A communicate with each other via communication channel 130. In estimation profile 100A of communication system 100, transmitter 110A and receiver 120A provide an estimation of transmission characteristics of communication channel 130 ("channel 130").

In a transmission profile 100B of communication system 100, transmitter 110 includes transmitter configurable logic in logic state B 111B ("transmitter 110B") and receiver 120 includes receiver configurable logic in logic state B 121B ("receiver 120B"). Transmitter 110B and receiver 120B are adapted to the transmission characteristics of communication channel 130 provided from estimation profile 100A.

In an exemplary embodiment of the present invention transmitter 110A (110B) is part of a first FPGA and receiver 120A (120B) is part of a second FPGA. In a first stage the configurable logic in the first FPGA associated with transmitter 110A (transmitter configurable logic in logic state A 111A) is programmed to performed an estimation function. Similarly, in the first stage the configurable logic in the second FPGA associated with receiver 120A (receiver configurable logic in logic state A 121A) is also programmed to performed an estimation function. After the estimation function is completed, part or all of the configurable logic associated with the transmitter 110A and receiver 120A can be reprogrammed, i.e., reconfigured, in one example, without shutting off the power to the FPGAs, in order to perform a data transmission function. Thus as shown in FIGS. 1A and 1B, in a second stage, the configurable logic of transmitter 110A (transmitter configurable logic in logic state A 111A) is reconfigured to the transmitter configurable logic in logic state B 111B (i.e., transmitter 110B) to perform a data transmission function. Similarly, the configurable logic of receiver 120A (receiver configurable logic in logic state A 121A) is reconfigured to the receiver configurable logic in logic state B 121B (i.e., receiver 120B). One advantage of the reuse of the configurable logic in the FPGA is that less CLBs are needed and a smaller size FPGA may be used.

FIG. 2A is a block/schematic diagram depicting an exemplary embodiment of dynamically reconfigurable channel adaptive communication system 100. Communication system 100 may use any of a variety of known modulation schemes, such as Binary Phase Shift Keying ("BPSK"), Continuous Phase Frequency Shift Keying ("CPFSK"), Quadrature Phase Shift Keying ("QPSK"), or Quadrature Amplitude Modulation ("QAM"), as well as other known modulation schemes. Communication system 100 may also use any of a variety of adaptive channel equalization techniques, such as Least Mean Squares ("LMS"), Recursive Least Squares ("RLS"), and other well known techniques. Communication system 100 may be implemented in configurable logic such as configurable logic in at least one Programmable Logic Device ("PLD"). An example of a PLD is a Field Programmable Gate Array ("FPGA"). An exemplary embodiment of an FPGA is described below in more detail with reference to FIG. 7.

With continued reference to FIG. 2A and renewed reference to FIG. 1A, communication system 100 is further described. Communication system 100 has a dynamically reconfigurable transmitter 110 ("transmitter 110") and a dynamically reconfigurable receiver 120 ("receiver 120"). Transmitter 110 includes a transmitter controller 103 and reconfigurable transmitter logic 104. Reconfigurable transmitter logic 104 includes a reconfigurable encoder 101, a transmission conduit 113, an adaptive pre-equalizer 102, a memory block 114, and a reverse link demodulator 109. Receiver 120 has a receiver controller 106 and reconfigurable receiver logic 107. Reconfigurable receiver logic 107 includes a reconfigurable demodulator 105 and a reverse link modulator 108.

For purpose of clarity by way of example, it is assumed that transmitter 110 and receiver 120 are embodied in separate FPGAs. However, other known PLDs may be used. FPGA configurable logic may be reused, and thus is referred to herein as reconfigurable logic. Instantiated in FPGA reconfigurable logic is reconfigurable encoder 101 in transmitter 110 and reconfigurable demodulator 105 in receiver 120. FPGA reconfigurable logic 104 and 107, employed respectively in transmitter 110 and receiver 120, are provided for dynamic reconfiguration of communication system 100, as described below in additional detail.

Adaptive pre-equalizer ("pre-equalizer") 102 may be provided with dedicated logic of transmitter 110 to reduce size and power consumption of receiver 120. Alternatively, as in this exemplary embodiment, pre-equalizer 102 may be instantiated in reconfigurable transmitter logic 104.

Communication system 100 uses communication channel 130 for bidirectional transmission of information between transmitter 110 and receiver 120. In this particular embodiment, transmitter 110 uses the Quadrature Amplitude Modulation (QAM) scheme to modulate information. The encoding is provided by reconfigurable encoder 101. For the reverse link transmission in this embodiment, reverse link modulator 108 and demodulator 109 use Binary Phase Shift Keying ("BPSK").

Transmitter controller 103 and receiver controller 106 respectively configure reconfigurable logic 104 of transmitter 110 and reconfigurable logic 107 of receiver 120 to instantiate estimation profile 100A for communication system 100. Transmission controller 103 instantiates reconfigurable encoder 101 of reconfigurable transmitter logic 104 to provide for preamble modulation. Transmitter controller 103 instantiates reconfigurable transmitter logic 104 to provide for transmission conduit 113 and reverse link demodulator 109. Receiver controller 106 instantiates reconfigurable demodulator 105 of reconfigurable receiver logic 107 to provide for preamble demodulation. Receiver controller 106 instantiates reconfigurable receiver logic 107 to provide for reverse link modulator 108. Notably, cores may be accessed by controller circuitry and used to instantiate circuits in reconfigurable logic. Such cores may be stored in memory of an FPGA or memory coupled externally to an FPGA.

In estimation profile 100A, a preamble series of information known to receiver 120 is encoded by a reconfigurable encoder 101 of transmitter 110 as an input signal. The input signal is sent from reconfigurable encoder 101 of transmitter 110 to reconfigurable demodulator 105 of receiver 120 via transmission conduit 113 and communication channel 130.

Reconfigurable demodulator 105 of receiver 120 decodes the encoded input signal. The preamble information contained in the decoded signal is compared by reconfigurable receiver logic 107 versus a template of the same preamble information previously stored in receiver 120. An inverse frequency response of communication channel 130 is computed as a result of this comparison.

The inverse frequency response of communication channel 130 is encoded into a return signal and sent by reverse link modulator 108 of receiver 120 to a reverse link demodulator 109 of transmitter 110. Reverse link demodulator 109 demodulates the return signal, extracts the inverse frequency response of communication channel 130 from the return signal, and stores the inverse frequency response of communication channel 130 in transmitter memory, such as memory block 114.

With continued reference to FIG. 2A and renewed reference to FIG. 1B, transmission profile 100B of communication system 100 is further described. Transmitter controller 103 and receiver controller 106 respectively configure reconfigurable logic 104 of transmitter 110 and reconfigurable logic 107 of receiver 120 to instantiate transmission profile 100B for communication system 100.

Transmitter controller 103 instantiates in reconfigurable transmitter logic 104 a pre-equalizer 102. Transmitter controller 103 instantiates reconfigurable encoder 101 in reconfigurable transmitter logic 104, which in this example is to provide for QAM encoding. Furthermore, transmitter controller 103 disables transmission conduit 113 and reverse link demodulator 109. Receiver controller 106 instantiates reconfigurable demodulator 105, which in this example is to provide for QAM decoding. Receiver controller 106 also disables reverse link modulator 108.

For transmission profile 100B, reconfigurable encoder 101 provides QAM encoding of information. Pre-equalizer 102 provides correction for inter-symbol interference ("ISI") distortion of encoded information in communication channel 130. Transmitter 110 sends corrected encoded information to receiver 120 via communication channel 130. Reconfigurable demodulator 105 of receiver 120 provides QAM decoding for the corrected encoded information received from transmitter 110 via communication channel 130. ISI distortion in communication channel 130 is reduced to a negligible level or entirely eliminated due to the correction provided during estimation profile 100A.

Figure 2B:
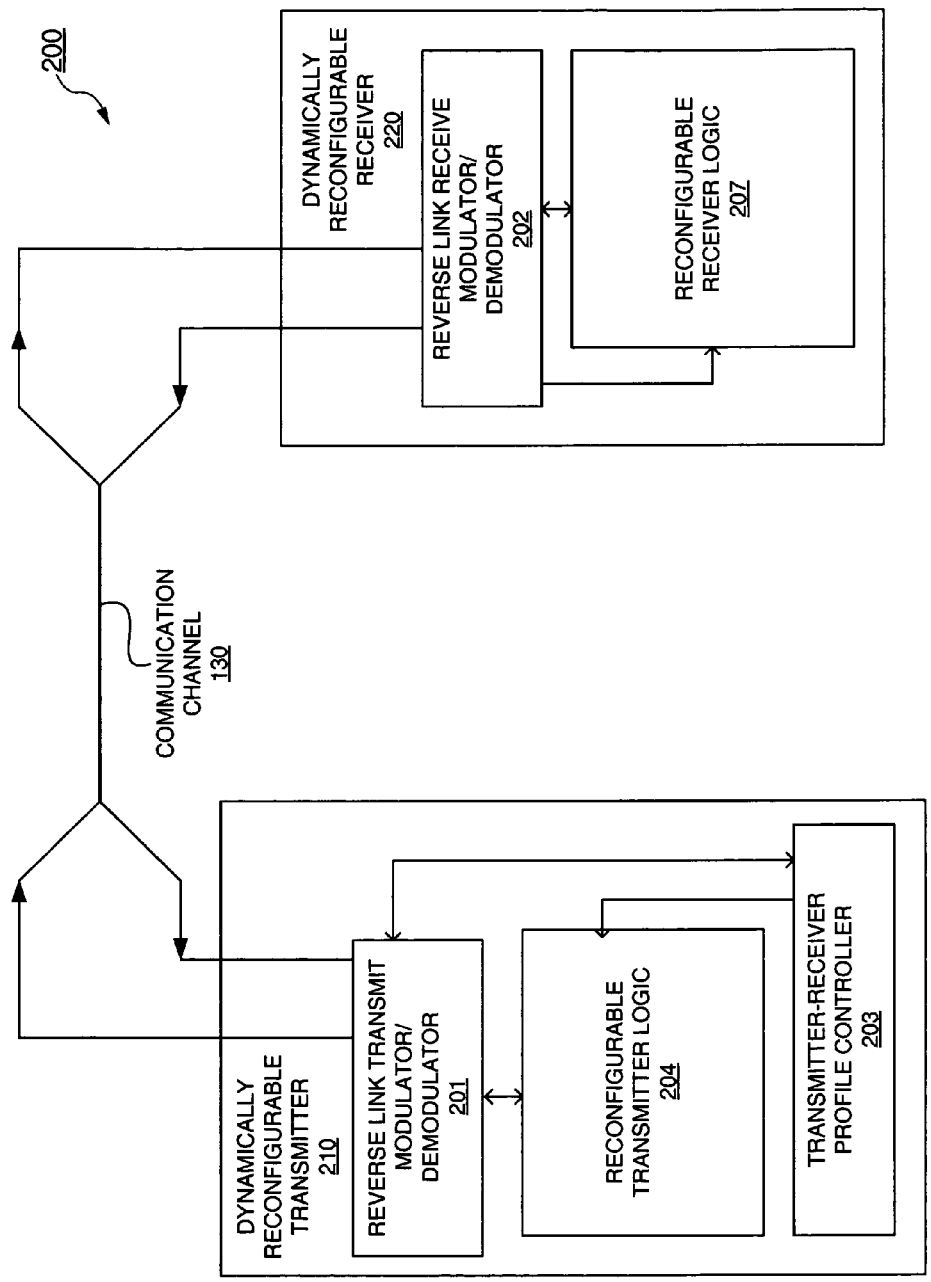
FIG. 2B is a block/schematic diagram depicting an exemplary embodiment of a dynamically reconfigurable channel adaptive communication system with in-transmitter controller.

FIG. 2B is a block/schematic diagram depicting an exemplary embodiment of a dynamically reconfigurable channel adaptive communication system 200 ("communication system 200"). Communication system 200 is an embodiment of communication system 100 in which separate transmitter and receiver controllers are combined into one transmitter-receiver profile controller 203 ("controller 203").

Controller 203 instantiates dynamic configuration profiles for communication system 200. For dynamically reconfigurable transmitter 210, controller 203 uses on-chip communication with reconfigurable transmitter logic 204 for instantiating a configuration profile. However, for dynamically reconfigurable receiver 220, controller 203 communicates configuration bit stream information over communication channel 130 coupled between a reverse link transmit modulator-demodulator 201 and a reverse link receive modulator-demodulator 202. Reverse link receive modulator-demodulator 202 uses such configuration bit stream information for instantiating a configuration profile in reconfigurable receiver logic 207. Reverse link transmit modulator-demodulator 201 and reverse link receive modulator-demodulator 202 may be respectively instantiated in reconfigurable logic 204 and 207. Reverse link transmit modulator-demodulator 201 is part of dynamically reconfigurable transmitter 210 ("transmitter 210"), and reverse link receive modulator-demodulator 202 is part of dynamically reconfigurable receiver 220 ("receiver 220").

Communication system 200 may be instantiated either in an estimation profile or in a transmission profile, as was described with reference to communication system 100 of FIG. 1B. With simultaneous reference to FIGS. 1A, 1B, and 2B, communication system 200 is further described. For the estimation profile, controller 203 configures reconfigurable logic 204 of transmitter 210 and reconfiguration logic 207 of receiver 220 to the profile of estimation profile 100A of communication system 110. Similarly, for the transmission profile, controller 203 configures reconfigurable logic 204 and reconfigurable logic 207 to the profile of communication profile 100B of communication system 100. Configuration of transmitter 210 is provided by controller 203 directly within transmitter 210. Configuration of receiver 220 is provided by controller 203 via reverse link transmit modulator-demodulator 201 and reverse link receive modulator-demodulator 202. Functionality of communication system 200 is otherwise the same as that of functionality of communication system 100 described above and thus its description is not repeated.

Communication system 100 and communication system 200 may use different configuration profiles to enhance and optimize FPGA hardware layout and power usage efficiency. By way of example but not limitation, examples of dynamically reconfigurable profiles are provided by FIGS. 1A and 1B. Such examples for communication system 100, which are the same for communication system 200, include estimation profile 100A with transmitter 110A and receiver 120A and transmission profile 100B with transmitter 110B and receiver 120B, which are described below in more detail.

Figure 3:
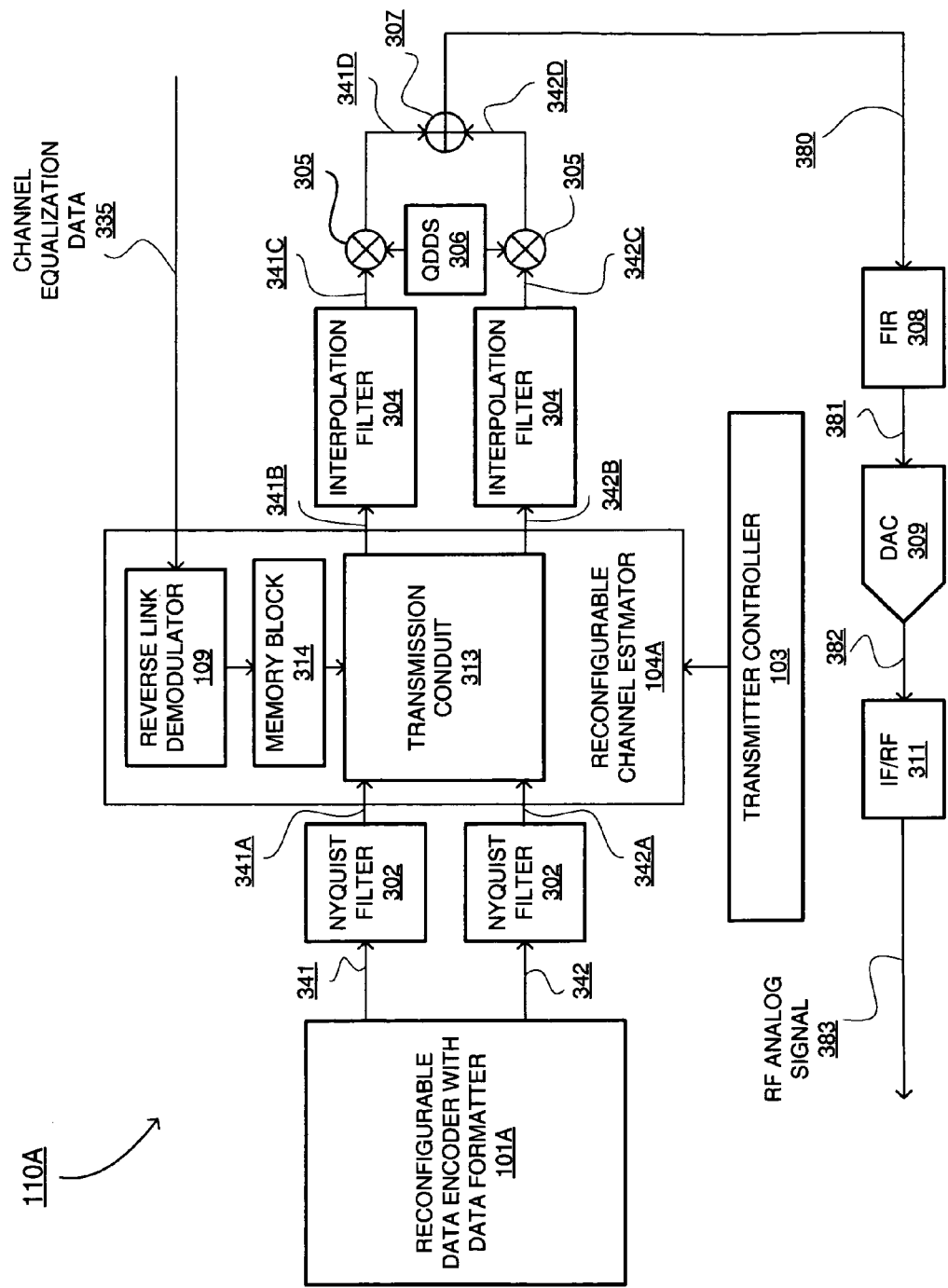
FIG. 3 is a block diagram depicting an exemplary embodiment of a dynamically reconfigurable transmitter in a transmitter estimation profile.

FIG. 3 is a block diagram depicting an exemplary embodiment of a dynamically reconfigurable transmitter 110 of FIG. 2A for estimation profile 100A of FIG. 1A, namely transmitter 110A. With renewed reference to FIGS. 1A and 2A, transmitter 110A is further described with reference to FIG. 3. Transmitter controller 103 instantiates in reconfigurable logic a reconfigurable data encoder with data formatter ("encoder") 101A. Transmitter controller 103 instantiates in reconfigurable logic a reconfigurable channel estimator ("estimator") 104A. Encoder 101A and estimator 104A may be instantiated in reconfigurable transmitter logic 104. Estimator 104A includes a reverse link demodulator 109, a transmission conduit 313, and a memory block 314.

Encoder 101A generates an a priori known preamble digital sequence of information. For the QAM embodiment described herein, encoder 101A generates two similar preamble data sequences ("sequences") 341 and 342, which are, respectively, sine and cosine versions of the preamble sequence of information, one phase shifted ninety degrees with respect to the other. Sequences 341 and 342 are provided to respective Nyquist filters 302 as inputs. Nyquist filters 302 filter possibly excessive digital frequencies below the Nyquist rate for sequences 341 and 342 and then provide filtered sequences 341A and 342A to transmission conduit 313.

Transmission conduit 313 inputs filtered sequences 341A and 342A into interpolation filters 304 as transmitted sequences 341B and 342B. Interpolation filters 304 up samples transmitted sequences 341B and 342B into digital Intermediate Frequency ("IF") signals 341C and 342C and inputs up sampled IF signals 341C and 342C into digital mixers 305. Quadrature Direct Digital Synthesizer ("QDDS") 306 provides phase synchronization of IF signals 341C and 342C for digital mixers 305 with a precision used for the QAM modulation scheme. Digital mixers 305 input synchronized sequences 341D and 342D into digital combiner 307. Digital combiner 307 combines sequences 341D and 342D via algebraic summation into one QAM modulated signal 380 at an IF frequency.

Digital combiner 307 provides QAM signal 380 to a Finite Impulse Response ("FIR") filter 308 as input. FIR filter 308 compensates for any x/sin(x) signal offset due to the up sampling by interpolation filters 304. FIR filter 308 centers QAM signal 380 at a carrier frequency ("carrier-centered"). FIR filter 308 provides carrier-centered QAM signal 381 as input to a Digital-to-Analog Converter ("DAC") 309. DAC 309 provides an analog version of carrier-centered QAM signal 381, namely analog signal 382, as input to heterodyne converter 311. Heterodyne converter 311 converts analog signal 382 at an IF frequency to an analog signal 383 at a Radio Frequency ("RF") ("RF analog signal 383"). Heterodyne converter 311 provides RF analog signal 383, which includes encoded preamble information, for transmission via communication channel 130 as output of transmitter 110A.

Figure 4:
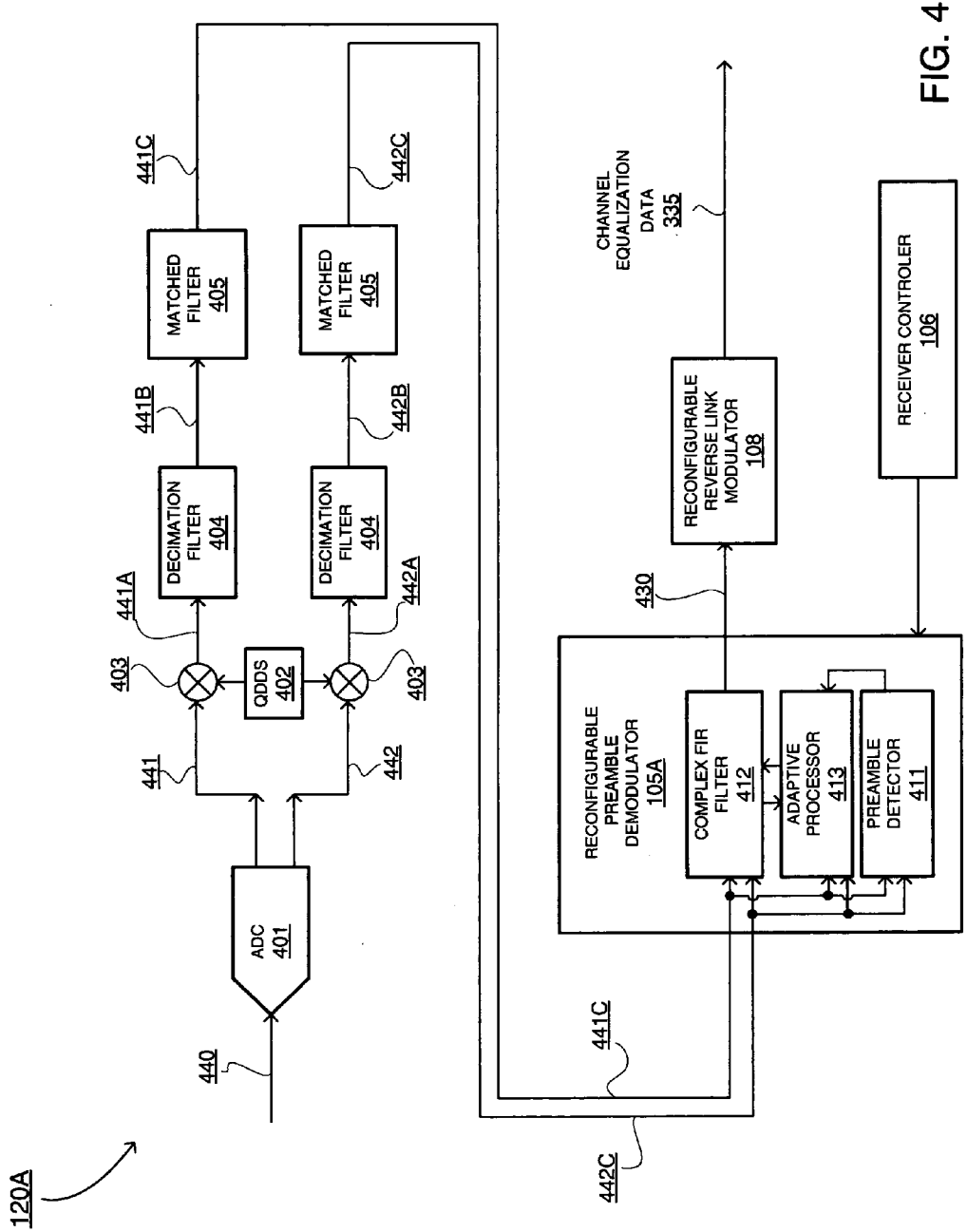
FIG. 4 is a block diagram depicting an exemplary embodiment of a dynamically reconfigurable receiver in an acquisition profile.

FIG. 4 is a block diagram depicting an exemplary embodiment of a dynamically reconfigurable receiver in an acquisition profile, namely receiver 120A of communication system 100 in estimation profile 100A. With renewed reference to FIGS. 1A and 2A, receiver 120A is further described with reference to FIG. 4. For receiver 120A, receiver controller 106 instantiates in reconfigurable logic a reconfigurable preamble demodulator 105A. Receiver controller 106 configures reconfigurable receiver logic 107 to provide for a reverse link modulator 108. Reconfigurable preamble demodulator 105A includes a complex FIR filter 412, an adaptive processor 413, and a preamble detector 411.

Receiver 120A receives input signal 440 from transmitter 110A via communication channel 130. Input signal 440 is RF analog signal 383 of FIG. 3 altered by a frequency response function of communication channel 130. Notably, RF analog signal 383, and hence input signal 440 as well, include preamble information. Signal 440 is input to Analog-to-Digital Converter ("ADC") 401. Continuing the example of using QAM modulation, ADC 401 provides two data sequences, namely, data sequences 441 and 442, which are SIN and COS versions of input signal 440 with one phase shifted ninety degrees with respect to the other. Sequences 441 and 442 are provided to digital mixers 403 as inputs. QDDS 402 provides phase synchronization of sequences 441 and 442 for digital mixers 403. Digital mixers 403 input synchronized sequences 441A and 442A into decimation filters 404. Decimation filters 404 down sample synchronized sequences 441A and 442A from an RF frequency to an IF sample processing frequency. Decimation filters 404 provide down sampled sequences 441B and 442B as inputs to matched filters 405. Matched filters 405 filter noise from down sampled sequences 441B and 442B and provide matched sequences 441C and 442C as inputs to reconfigurable preamble demodulator 105A.

Matched sequences 441C and 442C are provided as inputs to each of preamble detector 411, adaptive processor 413, and complex FIR filter 412 of reconfigurable preamble demodulator 105A. Reconfigurable preamble demodulator 105A uses matched sequences 441C and 442C to determine a frequency response of communication channel 130. Adaptive processor 413 may, for example, implement Least Mean Squares ("LMS") adaptive channel equalization technique. Reconfigurable preamble demodulator 105A provides a QAM combined signal 430, containing a Z-transformed frequency response of communication channel 130, for verification versus the template of the a priori known preamble digital sequence of information stored in receiver 120A in advance. Reconfigurable preamble demodulator 105A calculates a set of adaptive filter coefficients to forward to transmitter 110A of FIG. 3 for adaptive channel equalization as described below.

Reconfigurable preamble demodulator 105A provides QAM combined signal 430, containing a Z-transformed frequency response of communication channel 130, as input to reverse link modulator 108. Reverse link modulator 108 modulates QAM combined signal 430 into an IF version thereof, namely channel equalization data 335, which is provided to transmitter 110A via communication channel 130.

With renewed reference to FIG. 3, reverse link demodulator 109 of transmitter 110A demodulates channel equalization data 335. Channel equalization data 335 is channel equalization data 335 of FIG. 4, namely it is conveyed from receiver 120A to transmitter 110A via communication channel 130. Reverse link demodulator 109 provides an inverse channel frequency response to memory block 314 for storage.

Figure 5:
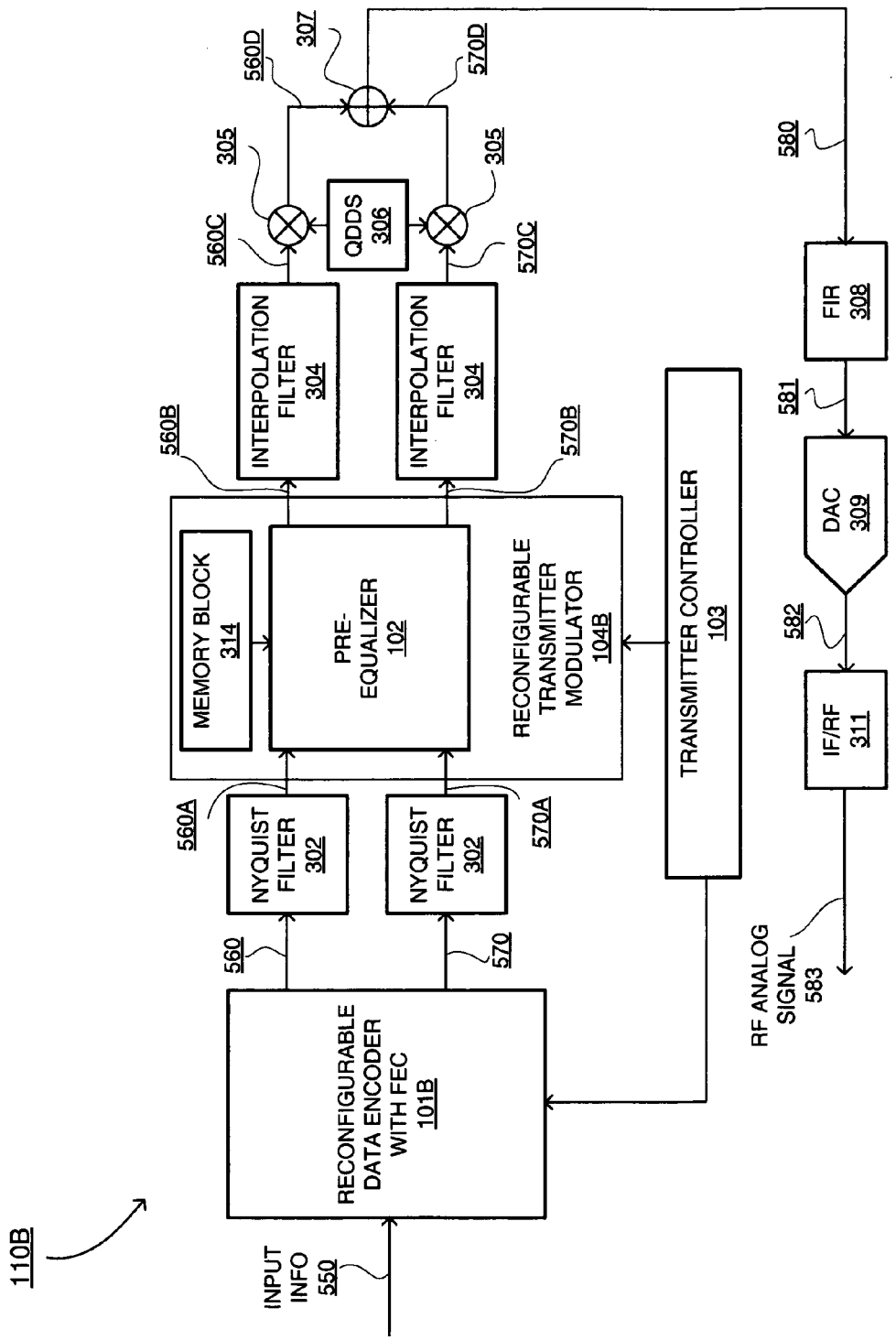
FIG. 5 is a block diagram depicting an exemplary embodiment of a dynamically reconfigurable transmitter in a transmitter modulation profile.

FIG. 5 is a block diagram depicting an exemplary embodiment of a dynamically reconfigurable transmitter 110 for transmission profile 100B, namely transmitter 110B. With renewed reference to FIGS. 1B and 3, transmitter 110B is further described in FIG. 5. After a reverse channel frequency response is provided to memory block 314 of transmitter 110A for storage, transmitter 110A is reconfigured into transmitter 110B. Transmitter controller 103 reconfigures reconfigurable data encoder with data formatter 101A into a reconfigurable data encoder with Forward Error Correction ("FEC") ("FEC encoder") 101B. Transmitter controller 103 configures reconfigurable channel estimator 104A into a reconfigurable transmitter modulator 104B. Transmitter modulator 104B includes a pre-equalizer 102 and memory block 314, which remains from transmitter 110A.

Transmitter 110B receives input information 550 as input to FEC encoder 101B. FEC encoder 101B provides FEC of input information 550. FEC may be Reed-Solomon ("RS") coding, data interleaving, or data scrambling, among other known types of FEC. FEC encoder 101B modulates input information such as QAM, as previously described.

FEC encoder 101B generates data sequences 560 and 570 which are SIN and COS versions of information 550, one being phase shifted ninety degrees with respect to the other. FEC encoder 101B encodes information sequences 560 and 570 and provides them as inputs to Nyquist filters 302 which filter excessive digital frequencies below the Nyquist rate from information sequences 560 and 570. Nyquist filters 302 provide filtered sequences 560A and 570A as inputs to pre-equalizer 102. The inverse frequency response of communication channel 130, which was stored during estimation profile 100A of communication system 100, is provided to pre-equalizer 102 from memory block 314.

Pre-equalizer 102 applies the stored inverse frequency response of channel 130 to encoded and filtered sequences 560A and 570A for correction from ISI. Corrected sequences 560B and 570B are provided as inputs to interpolation filters 304. Interpolation filters 304 up sample sequences 560B and 570B to an IF for transmission over communication channel 130 and provide up sampled sequences 560C and 570C as inputs to digital mixers 305. QDDS 306 provides phase synchronization of sequences 560C and 570C in digital mixers 305 for QAM modulation. Digital mixers 305 provide synchronized sequences 560D and 570D as inputs to digital combiner 307. Digital combiner 307 combines sequences 560D and 570D via algebraic summation into one digitally combined QAM modulated signal 580 at an IF frequency.

Digital combiner 307 provides QAM signal 580 as input to FIR filter 308. FIR filter 308 compensates for any x/sin(x) signal offset due to the up sampling by interpolation filters 304. FIR filter 308 filters QAM signal 580 to be carrier-centered, as described above with respect to QAM signal 380 of FIG. 3. FIR filter 308 provides carrier-centered QAM signal 581 as input to DAC 309. DAC 309 provides an analog version of carrier-centered QAM signal 581, namely analog signal 582, as input to heterodyne converter 311. Heterodyne converter 311 converts analog signal 582, which is at an IF frequency, to analog signal 583 at an RF frequency ("RF analog signal 583") for transmission via communication channel 130.

Figure 6:
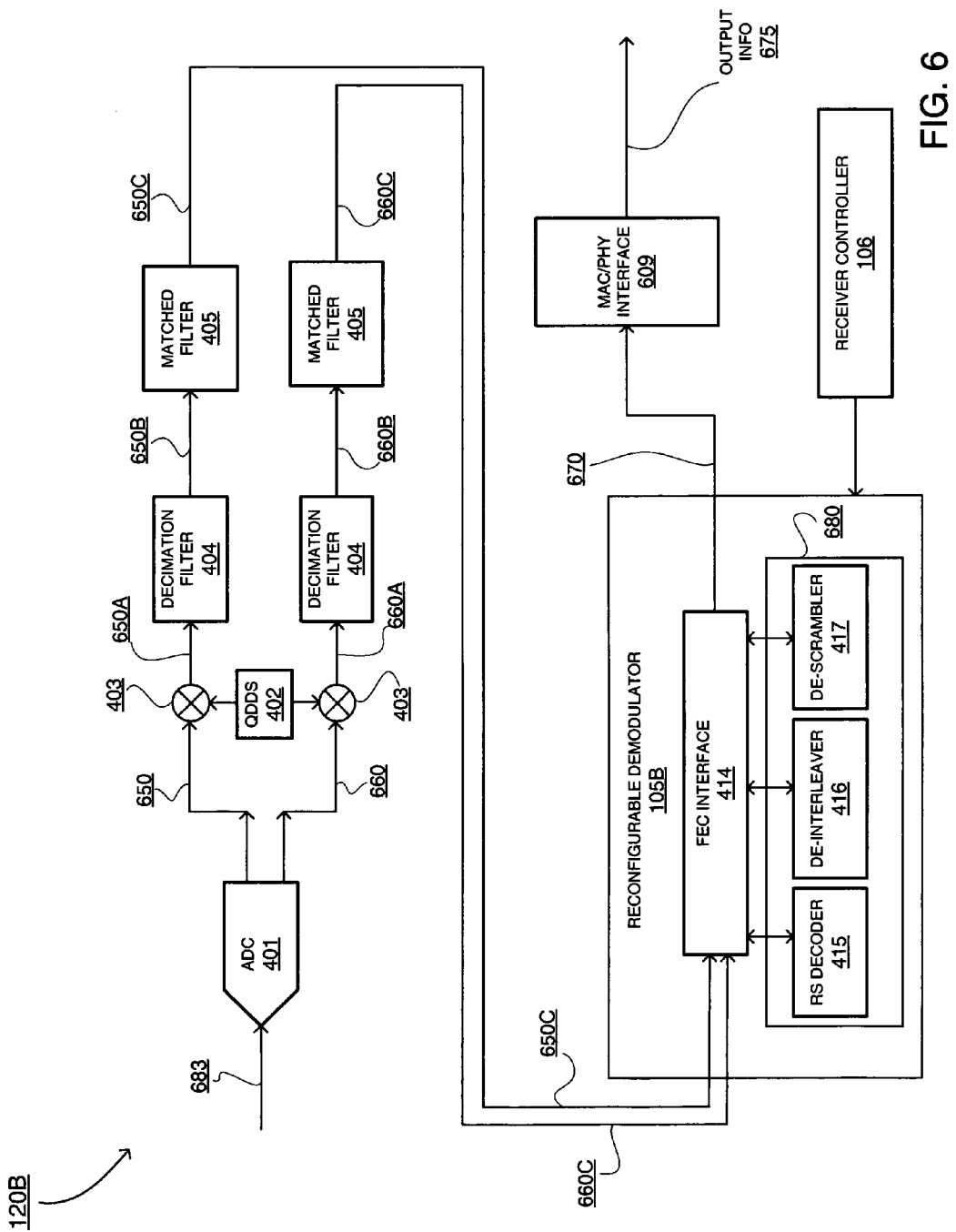
FIG. 6 is a block diagram depicting an exemplary embodiment of a dynamically reconfigurable receiver in a demodulation profile.

FIG. 6 is a block diagram depicting an exemplary embodiment of a dynamically reconfigurable receiver in a demodulation profile, namely receiver 120B of communication system 100 in transmission profile 100B. With renewed reference to FIGS. 1, 2A, and 4, receiver 120B is further described in FIG. 6. Receiver controller 106 disables reverse link modulator 108 and configures reconfigurable preamble demodulator 105A into a reconfigurable demodulator 105B ("demodulator 105B"), which has an FEC interface 414 and an FEC module 680. FEC module 680 includes a Reed Solomon ("RS") Decoder 415, a de-interleaver 416, and a de-scrambler 417.

Receiver 120B receives input signal 683 from transmitter 110A via communication channel 130. Input signal 683 is RF analog signal 583 altered by the estimation profile 110A frequency response function of communication channel 130. Notably, RF analog signal 583, and hence input signal 683 as well, include preamble information. In addition, since the inverse channel frequency response is applied prior to transmission of RF analog signal 583 by transmitter 110B, input signal 683 likewise has no ISI distortion caused by the frequency response of channel 130.

Signal 685 is provided as input to ADC 401. ADC 401 provides two data sequences 650 and 660, which are SIN and COS versions of input signal 685 with one phase shifted ninety degrees with respect to the other. Sequences 650 and 660 are provided to digital mixers 403 as inputs. QDDS 402 provides phase synchronization of sequences 650 and 660 for digital mixers 403. Digital mixers 403 provide synchronized sequences 650A and 660A as inputs to decimation filters 404. Decimation filters 404 down sample synchronized sequences 650A and 660A from the RF frequency to an IF sample processing frequency. Decimation filters 404 provide down sampled sequences 650B and 660B as inputs to matched filters 405. Matched filters 405 filter noise from sequences 650B and 660B and provide filtered sequences 650C and 660C as inputs to reconfigurable demodulator 105B.

Upon entering demodulator 105B, filtered sequences 650C and 660C are input to FEC interface 414. FEC interface 414 provides signals 650C and 660C in and out of FEC module 680. In FEC module 680, filtered sequences 650C and 660C are provided in and out of RS decoder 415, in and out of de-interleaver 416, and in and out of de-scrambler 417. Cited elements of FEC module 680 decode sequences 650C and 660C to extract input information 550. RS decoder 415 corrects digital errors of input information 550 encoded by encoder 101B. De-interleaver 416 provides reverse interleaving of input information 550 interleaved by encoder 101B. De-scrambler 417 provides reverse scrambling of input information 550 scrambled by encoder 101B.

After consecutive RS decoding, de-interleaving and de-scrambling, FEC interface 414 combines filtered signals 650C and 660C via algebraic summation into one decoded digital signal 670 as output of demodulator 105B. Demodulator 105B provides signal 670 to a Media Access Control/Physical Layer ("MAC/PHY") interface 609. MAC/PHY interface 609 provides output information 675 in MAC/PHY data format as output of receiver 120B. It should be appreciated that output information 675 includes input information 550.

Some FPGAs, such as the Virtex FGPA, can be programmed to incorporate blocks with pre-designed functionalities, i.e., "cores." A core can include a predetermined set of configuration bits that program the FPGA to perform one or more functions. Alternatively, a core can include source code or schematics that describe the logic and connectivity of a design. Typical cores can provide, but are not limited to, digital signal processing functions, memories, storage elements, and math functions. Some cores include a floor-planned layout targeted to a specific family of FPGAs. Cores may also be parameterizable, i.e., configured to allow the user to enter parameters to activate or change certain core functionality.

Figure 7:
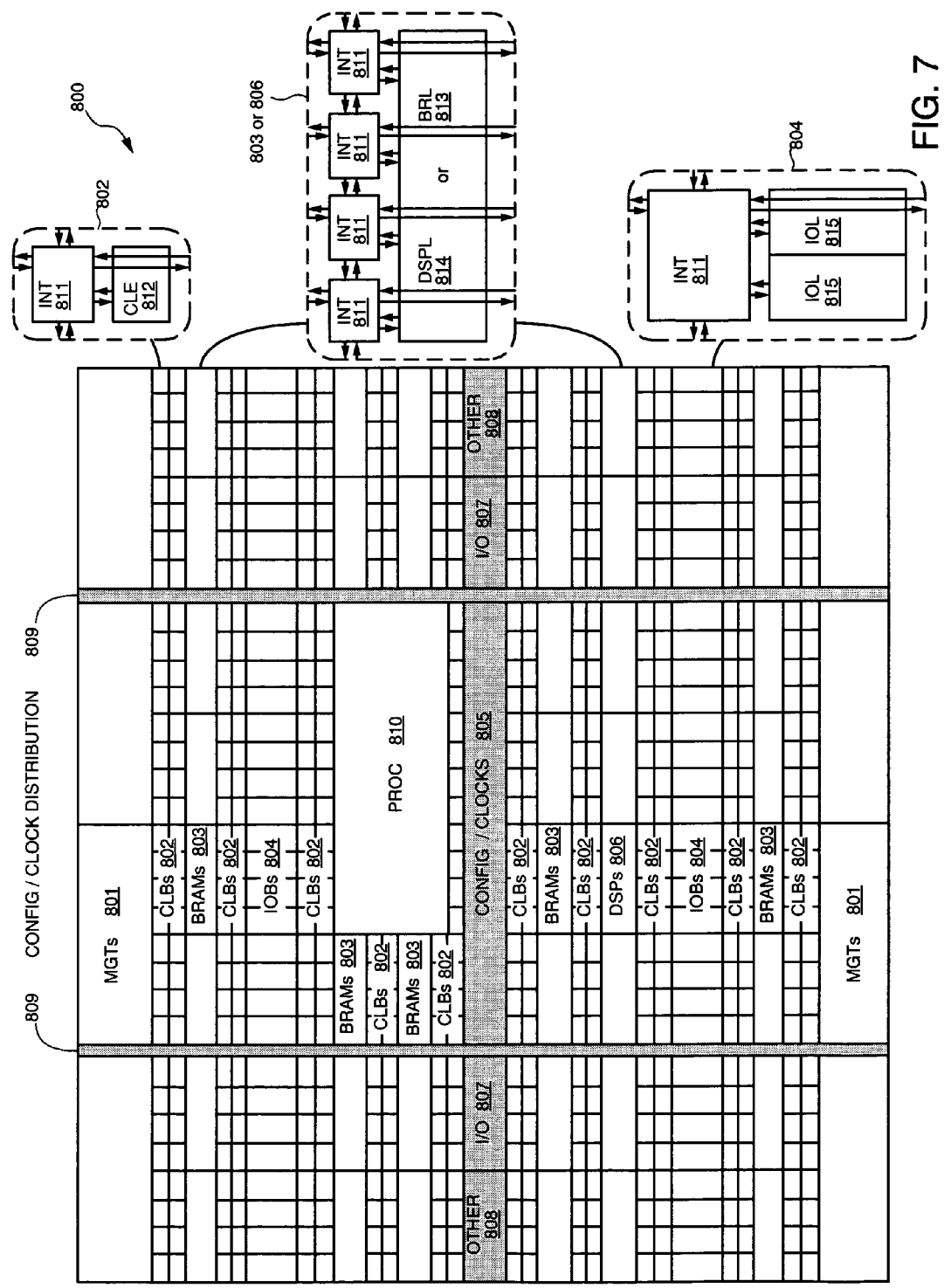
FIG. 7 is a simplified block diagram depicting an exemplary embodiment of a Field Programmable Gate Array.

As noted above, advanced FPGAs can include several different types of programmable logic blocks in the array. For example, FIG. 7 illustrates an FPGA architecture 800 that includes a large number of different programmable tiles including multi-gigabit transceivers ("MGTs") 801, configurable logic blocks ("CLBs") 802, random access memory blocks ("BRAMs") 803, input/output blocks ("IOBs") 804, configuration and clocking logic ("CONFIG/CLOCKS") 805, digital signal processing blocks ("DSPs") 806, specialized input/output blocks ("I/O") 807 (e.g., configuration ports and clock ports), and other programmable logic 808 such as digital clock managers, analog-to-digital converters, system monitoring logic, and so forth. Some FPGAs also include dedicated processor blocks ("PROC") 810.

In some FPGAs, each programmable tile includes a programmable interconnect element ("INT") 811 having standardized connections to and from a corresponding interconnect element in each adjacent tile. Therefore, the programmable interconnect elements taken together implement the programmable interconnect structure for the illustrated FPGA. The programmable interconnect element 811 also includes the connections to and from the programmable logic element within the same tile, as shown by the examples included at the right side of FIG. 7.

For example, a CLB 102 can include a configurable logic element ("CLE") 112 that can be programmed to implement user logic plus a single programmable interconnect element 111. A BRAM 103 can include a BRAM logic element ("BRL") 113 in addition to one or more programmable interconnect elements 111. Typically, the number of interconnect elements included in a tile depends on the height of the tile. In the pictured embodiment, a BRAM tile has the same height as four CLBs, but other numbers (e.g., five) can also be used. A DSP tile 106 can include a DSP logic element ("DSPL") 114 in addition to an appropriate number of programmable interconnect elements 111. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 are manufactured using metal layered above the various illustrated logic blocks, and typically are not confined to the area of the I/O logic element 115.

In the pictured embodiment, a columnar area near the center of the die (shown shaded in FIG. 7) is used for configuration, clock, and other control logic. Vertical areas 809 extending from this column are used to distribute the clocks and configuration signals across the breadth of the FPGA.

Some FPGAs utilizing the architecture illustrated in FIG. 7 include additional logic blocks that disrupt the regular columnar structure making up a large part of the FPGA. The additional logic blocks can be programmable blocks and/or dedicated logic. For example, the processor block 810 shown in FIG. 7 spans several columns of CLBs and BRAMs.

Note that FIG. 7 is intended to illustrate only an exemplary FPGA architecture in which one or more aspects of the invention may be implemented. The numbers of logic blocks in a column, the relative widths of the columns, the number and order of columns, the types of logic blocks included in the columns, the relative sizes of the logic blocks, and the interconnect/logic implementations included at the top of FIG. 7 are purely exemplary. For example, in an actual FPGA more than one adjacent column of CLBs is typically included wherever the CLBs appear, to facilitate the efficient implementation of user logic. Additional details regarding a columnar architected FPGA may be found in a co-pending patent application, namely, U.S. Pat. No. 7,187,200 B2 entitled, "Columnar Architecture" by Steve P. Young, filed Oct. 10, 2003, which is incorporated by reference herein in its entirety.

In some of the above embodiments one advantage over prior art is the reduction in the receiver power consumption and cost. This cost reduction along with the associated power savings, is enabled by being able to effectively "swap-out", using partial reconfiguration, the channel estimation function at the receiver once the channel frequency response has been established. This is typically not possible with other technologies. For example, in a ASIC or ASSP approach to the problem the channel estimator will be in-situ and consuming silicon real-estate whether it is on-line or not. Hence this ASIC or ASSP approach is not efficient, because the channel estimation function is only required when first establishing a communication link between the transmitter and receiver. Once the channel has been sounded and the channel characterization information sent back to the transmitter, the channel estimation block will no longer be used.

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. For example, reconfigurable channel estimator 104A of FIG. 3 may be instantiated in dynamically reconfigurable receiver 220 of FIG. 2B, where receiver 220 would both measure frequency response of a communication channel and determine an estimate of the inverse frequency response responsive to the measured frequency response. The inverse frequency response estimated could then be sent from receiver 220 to dynamically reconfigurable transmitter 210 of FIG. 2B for a pre-equalizer thereof, such as pre-equalizer 102 of FIG. 2A. Alternatively, pre-equalizer 102 of FIG. 2A may be instantiated in reconfigurable logic 107 of receiver 120 of FIG. 2A. Alternatively, pre-equalizer 102 of FIG. 2A may be partly instantiated in reconfigurable logic 104 of transmitter 110 and partly instantiated in reconfigurable logic 107 of receiver 120. Alternatively, estimator 104A of FIG. 3 may be partly instantiated in reconfigurable logic 104 of transmitter 110 of FIG. 2A and partly instantiated in reconfigurable logic 107 of receiver 120. Claim(s) listing steps do not imply any order of the steps. Trademarks are the property of their respective owners.

What is claimed is:

1. A method for communication of information, the method comprising:
    providing a first transceiver having transmitter reconfigurable logic;
    providing a second transceiver having receiver reconfigurable logic;
    providing a communication channel for the first transceiver to communicate with the second transceiver;
    configuring the transmitter reconfigurable logic to transmit preamble information and to receive a measurement of the preamble information;
    configuring the receiver reconfigurable logic to provide a preamble demodulator to measure the preamble information and to provide a reverse link modulator to transmit the preamble information measured;
    communicating the preamble information via the first transceiver to the second transceiver via the communication channel;
    measuring, with the preamble demodulator provided by the receiver reconfigurable logic of the second transceiver, the preamble information communicated;
    sending the measurement of the preamble information, via the reverse link modulator provided by the receiver reconfigurable logic of the second transceiver, to the first transceiver via the communication channel; and
    dynamically reconfiguring a portion of the receiver reconfigurable logic previously used to provide the preamble demodulator as a forward error correction interface and module for reception of modulated information.

2. The method, according to claim 1, further comprising determining an inverse frequency response of the communication channel by the second transceiver.

3. The method, according to claim 2, further comprising storing the inverse frequency response of the communication channel determined in memory of the second transceiver.

4. The method, according to claim 2, further comprising:
    reconfiguring at least a portion of the transmitter reconfigurable logic previously used for the communicating of the preamble information, the portion of the transmitter reconfigurable logic reconfigured for transmission of the modulated information.

5. The method, according to claim 2, further comprising:
    applying the inverse frequency response of the communication channel to an information signal modulated by the first transceiver to provide a corrected information signal.

6. The method, according to claim 5, further comprising:
    transmitting the corrected information signal from the first transceiver to the second transceiver via the communication channel;
    receiving by the second transceiver the corrected information signal transmitted via the communication channel; and
    demodulating the corrected information signal by the second transceiver to obtain demodulated corrected information therefrom.

7. The method, according to claim 5, wherein the receiver reconfigurable logic is a portion of a programmable logic device.

8. The method, according to claim 7, wherein the programmable logic device is a Field Programmable Gate Array.

9. The method, according to claim 5, wherein the transmitter reconfigurable logic is a portion of a programmable logic device.

10. A dynamically reconfigurable channel adaptive communication system, comprising:
- a transmitter having reconfigurable logic configured to transmit a modulated information signal;
- a receiver having reconfigurable logic, the receiver coupled to the transmitter to receive the modulated information signal;
- the transmitter and the receiver being coupled via a communication channel;
- a channel estimator instantiated in the reconfigurable logic of one of the transmitter and the receiver, the channel estimator being enabled to measure received modulated information signal and to determine an inverse frequency response of the communication channel responsive to the modulated information signal measured in a first mode;
- a pre-equalizer instantiated in the reconfigurable logic of the other one of the transmitter and the receiver to apply the inverse frequency response of the communication channel to the modulated information signal in a second mode; and
- a respective controller instantiated in each of the transmitter and the receiver to dynamically control reconfiguration of the reconfigurable logic of each of the transmitter and the receiver;
- the respective controller configured to swap out the channel estimator for the pre-equalizer when going from the first mode to the second mode by reusing at least a portion of the reconfigurable logic employed to provide the channel estimator for providing the pre-equalizer.

11. The dynamically reconfigurable channel adaptive communication system, according to claim 10, further comprising:
- a reverse link modulator instantiated in the reconfigurable logic of the receiver; and
- a reverse link demodulator instantiated in the reconfigurable logic of the transmitter.

12. The dynamically reconfigurable adaptive communication system, according to claim 10, wherein the transmitter is part of a first transceiver, and wherein the receiver is part of a second transceiver.

13. The dynamically reconfigurable channel adaptive communication system, according to claim 10, wherein the controller in the transmitter is used to instantiate the pre-equalizer in the reconfigurable logic of the transmitter.

14. The dynamically reconfigurable channel adaptive communication system, according to claim 10, wherein the controller in the receiver is used to instantiate the pre-equalizer in the reconfigurable logic of the receiver.

15. The dynamically reconfigurable channel adaptive communication system, according to claim 10, wherein the controller in the transmitter is used to instantiate the channel estimator in the reconfigurable logic of the transmitter.

16. The dynamically reconfigurable channel adaptive communication system, according to claim 10, wherein the controller in the receiver is used to instantiate the channel estimator in the reconfigurable logic of the receiver.

17. The dynamically reconfigurable channel adaptive communication system, according to claim 10, wherein the reconfigurable logic of the transmitter is part of a programmable logic device.

18. The dynamically reconfigurable channel adaptive communication system, according to claim 17, wherein the reconfigurable logic of the receiver is part of another programmable logic device.

19. The dynamically reconfigurable channel adaptive communication system, according to claim 18, wherein the programmable logic device and the other programmable logic device are respective Field Programmable Gate Arrays.

* * * * *